United States Patent
Sambhwani et al.

(10) Patent No.: US 8,149,773 B2
(45) Date of Patent: Apr. 3, 2012

(54) RESOURCE ALLOCATION FOR ENHANCED UPLINK USING AN ACQUISITION INDICATOR CHANNEL

(75) Inventors: Sharad Deepak Sambhwani, San Diego, CA (US); Juan Montojo, San Diego, CA (US); Wei Zeng, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 533 days.

(21) Appl. No.: 12/345,140

(22) Filed: Dec. 29, 2008

(65) Prior Publication Data

US 2009/0196242 A1    Aug. 6, 2009

Related U.S. Application Data

(60) Provisional application No. 61/019,191, filed on Jan. 4, 2008, provisional application No. 61/021,857, filed on Jan. 17, 2008.

(51) Int. Cl.
    *H04W 4/00* (2009.01)
(52) U.S. Cl. .................. 370/329; 370/341; 370/311
(58) Field of Classification Search ............... 370/329, 370/341, 311
    See application file for complete search history.

(56) References Cited

U.S. PATENT DOCUMENTS

| | | | |
|---|---|---|---|
| 8,050,208 B2 * | 11/2011 | Jung et al. ................... | 370/311 |
| 2004/0146019 A1 | 7/2004 | Kim et al. | |
| 2011/0007700 A1 * | 1/2011 | Aminaka et al. ............. | 370/329 |

OTHER PUBLICATIONS

International Search Report and Written Opinion—PCT/US2008/088559, International Search Authority—European Patent Office, Apr. 9, 2009.
Nokia, et al.: "Resource assignment for E-DCH access in CELL_FACH state" 3GPP Draft; R1-074303, 3rd Generation Partnership Project (3GPP), Mobile Competence Centre; 650 Route Des Lucioles; F-06921 Sophia-Antipolis Cedex; France, vol. tsg_ran\WG1_RL1\TSGR1_50b\Docs, no. Shanghai, China; Oct. 2, 2007, XP050107819.
Nsn et al. : "Analysis of AICH resource assignment methods for E-DCH access in CELL_FACH state," 3GPP Draft; R1-074666, 3rd Generation Partnership Project (3GPP), Mobile Competence Centre; 650,M Route Des Lucioles; F-06921 Sophia-Antipolis Cedex; France, vol. tsg_ran\WG1_RL1\TSGR1_51/Docs, no. Korea; Oct. 31, 2007, XP050108143.

* cited by examiner

*Primary Examiner* — David Q Nguyen
(74) *Attorney, Agent, or Firm* — Charles Eggers; D. Scott Juneau

(57) ABSTRACT

Techniques for supporting UE operation with enhanced uplink are described. A UE may select a first signature from a first set of signatures available for random access for enhanced uplink, generate an access preamble based on the first signature, and send the access preamble for random access while operating in an inactive state. The UE may receive an acquisition indicator (AI) for the first signature on an acquisition indicator channel (AICH) from a Node B. The UE may use a default enhanced dedicated channel (E-DCH) resource configuration for the first signature if the AI has a first predetermined value. The UE may determine an E-DCH resource configuration allocated to the UE based on an extended acquisition indicator (EAI) and a second signature if the AI has a second predetermined value. In any case, the UE may send data to the Node B using the allocated E-DCH resource configuration.

21 Claims, 10 Drawing Sheets

RESOURCE ALLOCATION FOR ENHANCED UPLINK USING AN ACQUISITION INDICATOR CHANNEL

I. CLAIM OF PRIORITY UNDER 35 U.S.C. §119

The present Application for Patent claims priority to Provisional U.S. Application Ser. No. 61/019,191, filed Jan. 4, 2008, and Provisional U.S. Application Ser. No. 61/021,857, filed Jan. 17, 2008, both entitled "E-DCH RESOURCE ALLOCATION SCHEME IN CELL_FACH," assigned to the assignee hereof, and expressly incorporated herein by reference.

BACKGROUND

I. Field

The present disclosure relates generally to communication, and more specifically to techniques for allocating resources in a wireless communication system.

II. Background

Wireless communication systems are widely deployed to provide various communication services such as voice, video, packet data, messaging, broadcast, etc. These systems may be multiple-access systems capable of supporting multiple users by sharing the available system resources. Examples of such multiple-access systems include Code Division Multiple Access (CDMA) systems, Time Division Multiple Access (TDMA) systems, Frequency Division Multiple Access (FDMA) systems, Orthogonal FDMA (OFDMA) systems, and Single-Carrier FDMA (SC-FDMA) systems.

A wireless communication system may include a number of Node Bs that can support communication for a number of user equipments (UEs). A UE may communicate with a Node B via the downlink and uplink. The downlink (or forward link) refers to the communication link from the Node B to the UE, and the uplink (or reverse link) refers to the communication link from the UE to the Node B.

A UE may be intermittently active and may operate in (i) an active state to actively exchange data with a Node B or (ii) an inactive state when there is no data to send or receive. The UE may transition from the inactive state to the active state whenever there is data to send and may be assigned resources for a high-speed channel to send the data. However, the state transition may incur signaling overhead and may also delay transmission of data. It is desirable to reduce the amount of signaling in order to improve system efficiency and reduce delay.

SUMMARY

Techniques for supporting efficient UE operation with enhanced uplink for inactive state are described herein. Enhanced uplink refers to the use of a high-speed channel having greater transmission capability than a slow common channel on the uplink. A UE may be allocated resources for the high-speed channel for enhanced uplink while in an inactive state and may more efficiently send data using the allocated resources in the inactive state.

In one design, a UE may select a first signature from a first set of signatures available for random access for enhanced uplink. The UE may generate an access preamble based on the first signature. The UE may send the access preamble for random access while operating in an inactive state, e.g., a CELL_FACH state or an Idle mode. The UE may receive an acquisition indicator (AI) for the first signature on an acquisition indicator channel (AICH) from a Node B. The UE may use a default enhanced dedicated channel (E-DCH) resource configuration for the first signature as an allocated E-DCH resource configuration for the UE if the AI has a first predetermined value. The UE may also receive an extended acquisition indicator (EAI) and a second signature selected from a second set of signatures from the Node B. The UE may determine the allocated E-DCH resource configuration based on the EAI and the second signature if the AI has a second predetermined value. In any case, the UE may send data to the Node B using the allocated E-DCH resource configuration, e.g., while remaining in the inactive state.

Various aspects and features of the disclosure are described in further detail below.

DETAILED DESCRIPTION

The techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.20, IEEE 802.16 (WiMAX), 802.11 (WiFi), Flash-OFDM®, etc. UTRA and E-UTRA are part of Universal Mobile Telecommunication System (UMTS). 3GPP Long Term Evolution (LTE) is an upcoming release of UMTS that uses E-UTRA. UTRA, E-UTRA, UMTS, LTE and GSM are described in documents from an organization named "3rd Generation Partnership Project" (3GPP). cdma2000 and UMB are described in documents from an organization named "3rd Generation Partnership Project 2" (3GPP2). For clarity, certain aspects of the techniques are described below for WCDMA, and 3GPP terminology is used in much of the description below.

Figure 1:
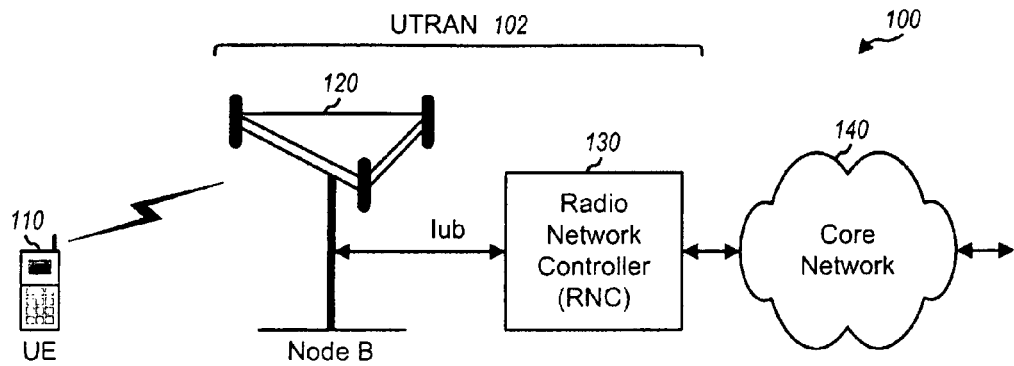
FIG. 1 shows a wireless communication system.

FIG. 1 shows a wireless communication system 100, which includes a Universal Terrestrial Radio Access Network (UTRAN) 102 and a core network 140. UTRAN 102 may include a number of Node Bs and other network entities. For simplicity, only one Node B 120 and one Radio Network Controller (RNC) 130 are shown in FIG. 1 for UTRAN 102. A Node B may be a fixed station that communicates with the UEs and may also be referred to as an evolved Node B (eNB), a base station, an access point, etc. Node B 120 provides communication coverage for a particular geographic area. The coverage area of Node B 120 may be partitioned into multiple (e.g., three) smaller areas. Each smaller area may be served by a respective Node B subsystem. In 3GPP, the term "cell" can refer to the smallest coverage area of a Node B and/or a Node B subsystem serving this coverage area.

RNC 130 may couple to Node B 120 and other Node Bs via an Iub interface and may provide coordination and control for these Node Bs. RNC 130 may also communicate with network entities within core network 140. Core network 140 may include various network entities that support various functions and services for UEs.

A UE 110 may communicate with Node B 120 via the downlink and uplink. UE 110 may be stationary or mobile and may also be referred to as a mobile station, a terminal, an access terminal, a subscriber unit, a station, etc. UE 110 may be a cellular phone, a personal digital assistant (PDA), a wireless modem, a wireless communication device, a handheld device, a laptop computer, a cordless phone, a wireless local loop (WLL) station, etc.

3GPP Release 5 and later supports High-Speed Downlink Packet Access (HSDPA). 3GPP Release 6 and later supports High-Speed Uplink Packet Access (HSUPA). HSDPA and HSUPA are sets of channels and procedures that enable high-speed packet data transmission on the downlink and uplink, respectively.

In WCDMA, data for a UE may be processed as one or more transport channels at a higher layer. The transport channels may carry data for one or more services such as voice, video, packet data, etc. The transport channels may be mapped to physical channels at a physical layer. The physical channels may be channelized with different channelization codes and may thus be orthogonal to one another in the code domain. WCDMA uses orthogonal variable spreading factor (OVSF) codes as the channelization codes for the physical channels.

Table 1 lists some transport channels in WCDMA.

TABLE 1

Transport Channels

| Channel | Channel Name | Description |
| --- | --- | --- |
| DCH | Dedicated Channel | Carry data on downlink or uplink for a specific UE. |
| HS-DSCH | High Speed Downlink Shared Channel | Carry data sent on downlink to different UEs for HSDPA. |
| E-DCH | Enhanced Dedicated Channel | Carry data sent on uplink by a UE for HSUPA. |
| RACH | Random Access Channel | Carry preambles and messages sent by UEs on uplink for random access. |
| FACH | Forward Access Channel | Carry messages sent on downlink to UEs for random access. |
| PCH | Paging Channel | Carry paging and notification messages. |

Table 2 lists some physical channels in WCDMA.

TABLE 2

Physical Channels

| | Channel | Channel Name | Description |
| --- | --- | --- | --- |
| | PRACH | Physical Random Access Channel | Carry the RACH. |
| | AICH | Acquisition Indicator Channel | Carry acquisition indicators sent on downlink to UEs. |

TABLE 2-continued

Physical Channels

| | Channel | Channel Name | Description |
| --- | --- | --- | --- |
| | F-DPCH | Fractional Dedicated Physical Channel | Carry Layer 1 control information, e.g., power control commands. |
| HSDPA | HS-SCCH (Downlink) | Shared Control Channel for HS-DSCH | Carry control information for data sent on the HS-PDSCH. |
| | HS-PDSCH (Downlink) | High Speed Physical Downlink Shared Channel | Carry data sent on the HS-DSCH to different UEs. |
| | HS-DPCCH (Uplink) | Dedicated Physical Control Channel for HS-DSCH | Carry ACK/NACK for data sent on the HS-PDSCH and channel quality indicator (CQI). |
| HSUPA | E-DPCCH (Uplink) | E-DCH Dedicated Physical Control Channel | Carry control information for the E-DPDCH. |
| | E-DPDCH (Uplink) | E-DCH Dedicated Physical Data Channel | Carry data sent on the E-DCH by a UE. |
| | E-HICH (Downlink) | E-DCH Hybrid ARQ Indicator Channel | Carry ACK/NACK for data sent on the E-DPDCH. |
| | E-AGCH (Downlink) | E-DCH Absolute Grant Channel | Carry absolute grants of E-DCH resources. |
| | E-RGCH (Downlink) | E-DCH Relative Grant Channel | Carry relative grants of E-DCH resources. |

WCDMA supports other transport channels and physical channels that are not shown in Tables 1 and 2 for simplicity. The transport channels and physical channels in WCDMA are described in 3GPP TS 25.211, entitled "Physical channels and mapping of transport channels onto physical channels (FDD)," which is publicly available.

Figure 2:
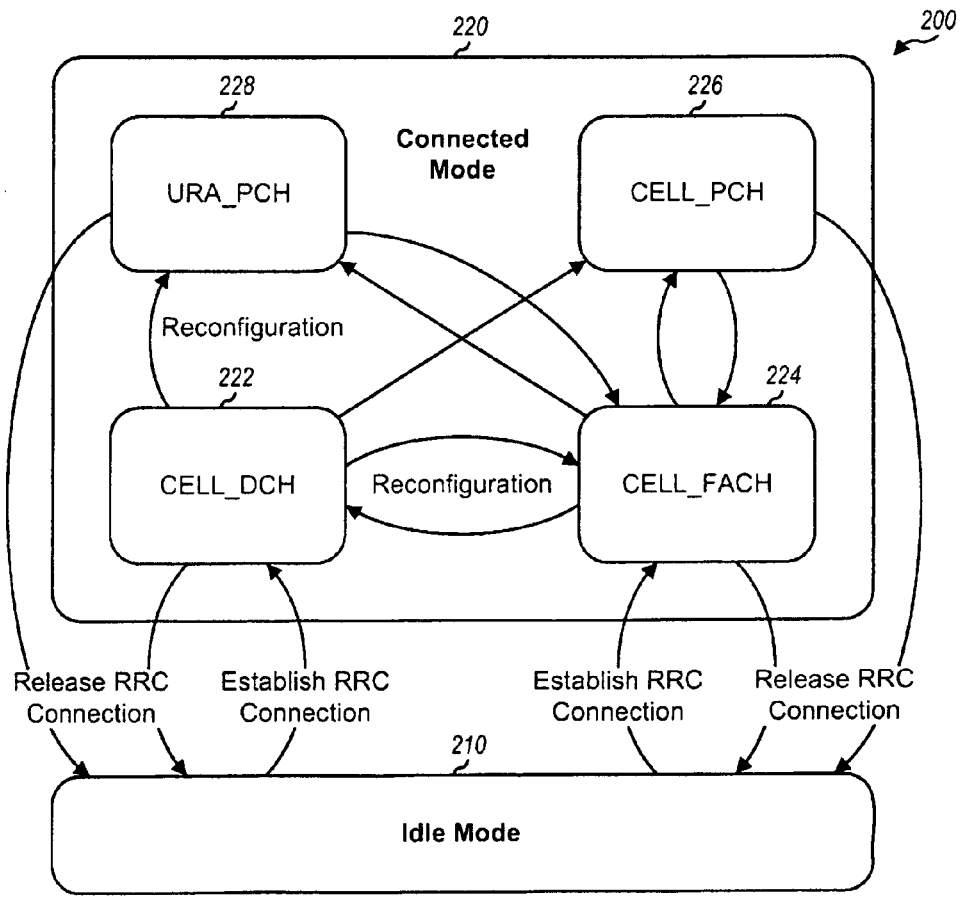
FIG. 2 shows a state diagram of Radio Resource Control (RRC) states.

FIG. 2 shows a state diagram 200 of Radio Resource Control (RRC) states for a UE in WCDMA. Upon being powered on, the UE may perform cell selection to find a suitable cell from which the UE can receive service. The UE may then transition to an Idle mode 210 or a Connected mode 220 depending on whether there is any activity for the UE. In the Idle mode, the UE has registered with the system, listens for paging messages, and updates its location with the system as necessary. In the Connected mode, the UE can receive and/or transmit data depending on its RRC state and configuration.

In the Connected mode, the UE may operate in one of four possible RRC states —a CELL_DCH state 222, a CELL_FACH state 224, a CELL_PCH state 226, and a URA_PCH state 228, where URA stands for User Registration Area. The CELL_DCH state is characterized by (i) dedicated physical channels being allocated to the UE for the downlink and uplink and (ii) a combination of dedicated and shared transport channels being available to the UE. The CELL_FACH state is characterized by (i) no dedicated physical channels being allocated to the UE, (ii) a default common or shared transport channel being assigned to the UE for use to access the system, and (iii) the UE continually monitoring the FACH for signaling such as Reconfiguration messages. The CELL_PCH and URA_PCH states are characterized by (i) no dedicated physical channels being allocated to the UE, (ii) the UE periodically monitoring the PCH for pages, and (iii) the UE not being permitted to transmit on the uplink.

While in the Connected mode, the system can command the UE to be in one of the four RRC states based on activity of the UE. The UE may transition (i) from any state in the Connected mode to the Idle mode by performing a Release RRC Connection procedure, (ii) from the Idle mode to the CELL_DCH or CELL_FACH state by performing an Establish RRC Connection procedure, and (iii) between the RRC states in the Connected mode by performing a Reconfiguration procedure.

The modes and states for the UE in WCDMA are described in 3GPP TS 25.331, entitled "Radio Resource Control (RRC); Protocol Specification," which is publicly available. The various procedures for transitioning to/from the RRC states as well as between the RRC states are also described in 3GPP TS 25.331.

UE 110 may operate in the CELL_FACH state when there is no data to exchange, e.g., send or receive. UE 110 may transition from the CELL_FACH state to the CELL_DCH state whenever there is data to exchange and may transition back to the CELL_FACH state after exchanging the data. UE 110 may perform a random access procedure and an RRC Reconfiguration procedure in order to transition from the CELL_FACH state to the CELL_DCH state. UE 110 may exchange signaling messages for these procedures. For WCDMA, resources are normally allocated by an RNC via message exchanges that can result in both signaling overhead and setup delay.

Figure 3:
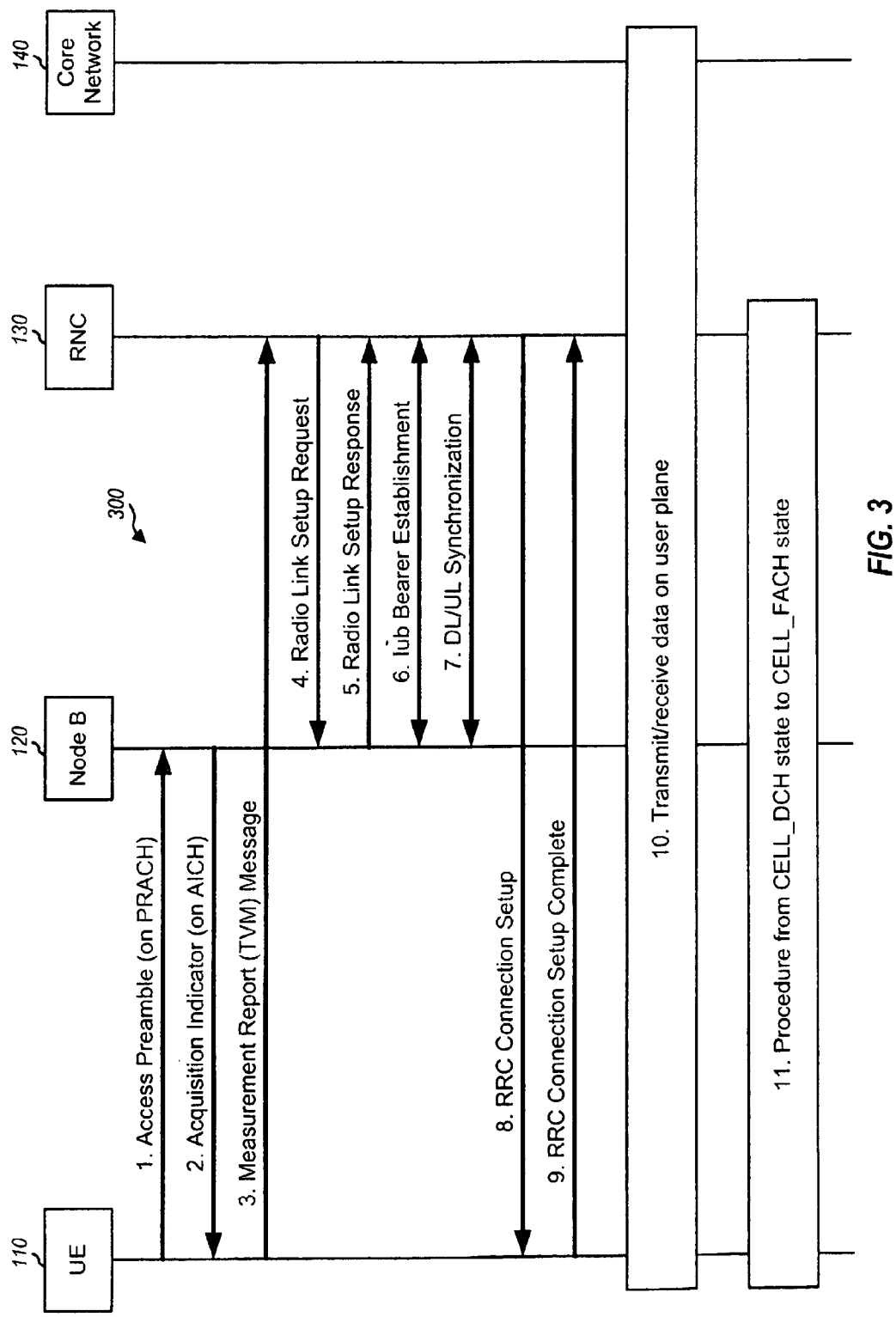
FIG. 3 shows a call flow for operation without enhanced uplink.

FIG. 3 shows a call flow 300 for data transmission using the RACH in the CELL_FACH state. UE 110 may operate in the CELL_FACH state and may desire to send data. UE 110 may perform a random access procedure and may randomly select a signature from a set of signatures available for random access on the PRACH. The available signatures may also be referred to as preamble signatures, PRACH signatures, etc. The selected signature may be used as a temporary UE identity for the random access procedure. UE 110 may generate an access preamble based on the selected signature and may send the access preamble on the uplink (step 1). The access preamble may also be referred to as a PRACH preamble, a RACH preamble, etc. For WCDMA, a 4096-chip access preamble may be generated by repeating a 16-chip signature 256 times. Node B 120 may receive the access preamble from UE 110 and may return an acquisition indicator (AI) on the AICH to UE 110 (step 2). The AI may indicate a positive acknowledgement for the signature sent in the access preamble by UE 110.

UE 110 may then send a Measurement Report message containing a traffic volume measurement (TVM) or buffer size to RNC 130 using the slow PRACH (step 3). RNC 130 may set up an RRC connection for UE 110 and may send a Radio Link Setup Request message to Node B 120 (step 4). Node B 120 may set up a radio link for UE 110 and may return a Radio Link Setup Response message to RNC 130 (step 5). RNC 130 may exchange signaling messages with Node B 120 to establish an Iub bearer for UE 110 (step 6) and to synchronize the Iub bearer for the downlink and uplink (step 7). RNC 130 may then send an RRC Connection Setup message containing dedicated resources to UE 110 (step 8). UE 110 may transition to the CELL_DCH state upon receiving the RRC Connection Setup message and may return an RRC Connection Setup Complete message to RNC 130 (step 9).

UE 110 may then send data using the allocated uplink resources (step 10). After some time, UE 110 may exchange signaling messages with RNC 130 to release the allocated resources and may then transition from the CELL_DCH state back to the CELL_FACH state (step 11).

As shown in FIG. 3, UE 110, Node B 120, and RNC 130 may exchange various signaling messages in order to allocate uplink resources to UE 110 for data transmission on the uplink. The message exchanges may increase signaling overhead and may further delay transmission of data by UE 110.

In many instances, UE 110 may have only a small message or a small amount of data to send, and the signaling overhead may be especially high in these instances. Furthermore, UE 110 may send a small message or a small amount of data periodically, and performing call flow 300 each time UE 110 needs to send data may be very inefficient.

In an aspect, an enhanced uplink (EUL) is provided to improve UE operation in an inactive state. In general, an inactive state may be any state or mode in which a UE is not allocated dedicated resources for communication with a Node B. For RRC, an inactive state may comprise the CELL_FACH state, the CELL_PCH state, the URA_PCH state, or the Idle mode. An inactive state may be in contrast to an active state, such as the CELL_DCH state, in which a UE is allocated dedicated resources for communication with a Node B.

The enhanced uplink for inactive state may also be referred to as an Enhanced Random Access Channel (E-RACH), enhanced uplink in CELL_FACH state and Idle mode, an enhanced uplink procedure, etc. For WCDMA, the enhanced uplink may have the following characteristics:

Reduce latency of user plane and control plane in the Idle mode and the CELL_FACH, CELL_PCH and URA_PCH states, Support higher peak rates for UEs in the CELL_FACH, CELL_PCH and URA_PCH states by use of HSUPA, and Reduce state transition delay from the CELL_FACH, CELL_PCH and URA_PCH states to the CELL_DCH state.

For the enhanced uplink, UE 110 may be allocated E-DCH resources for data transmission on the uplink in response to an access preamble sent by the UE. In general, any resources may be allocated to UE 110 for the enhanced uplink. In one design, the allocated E-DCH resources may include the following:

E-DCH code—one or more OVSF codes for use to send data on the E-DPDCH,

E-AGCH code—an OVSF code to receive absolute grants on the E-AGCH,

E-RGCH code—an OVSF code to receive relative grants on the E-RGCH, and

F-DPCH position—location in which to receive power control commands to adjust transmit power of UE 110 on the uplink.

Other resources may also be allocated to UE 110 for the enhanced uplink.

Figure 4:
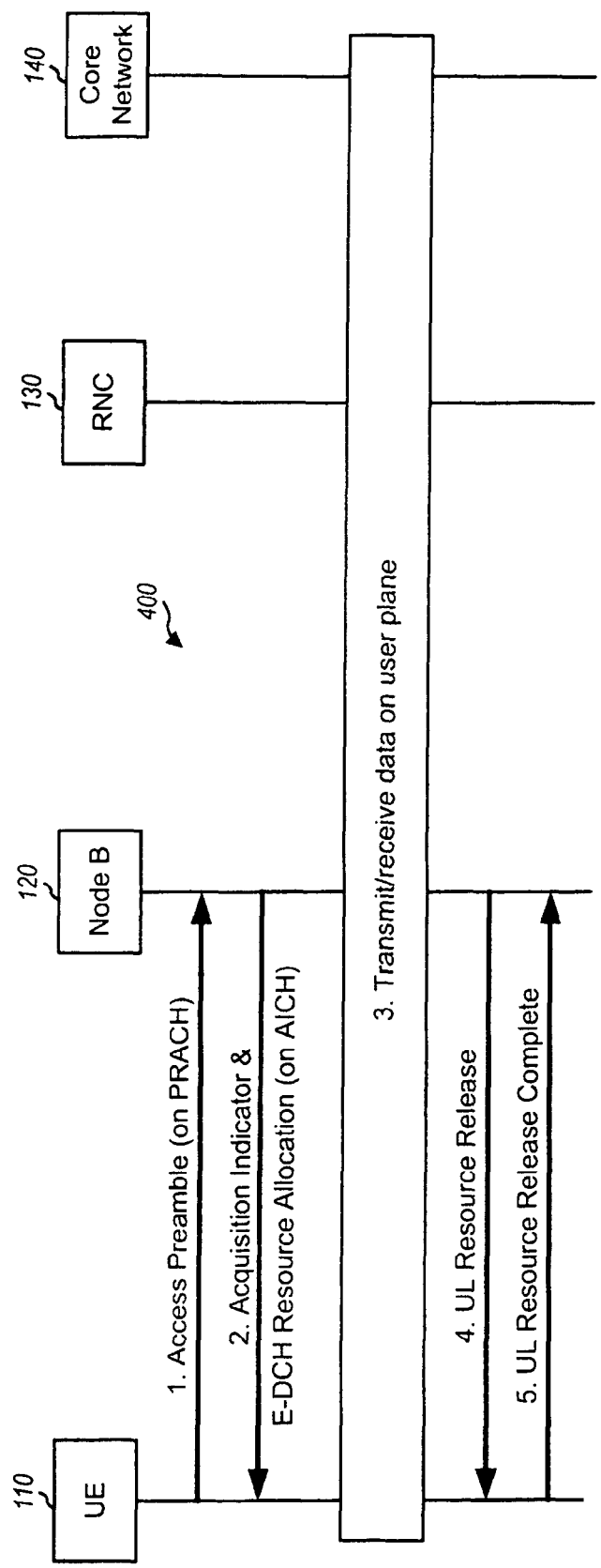
FIG. 4 shows a call flow for operation with enhanced uplink.

FIG. 4 shows a design of a call flow 400 for operation with the enhanced uplink.

UE 110 may operate in the CELL_FACH state and may desire to send a small amount of data. UE 110 may randomly select a signature, generate an access preamble based on the selected signature, and send the access preamble on the PRACH (step 1). Node B 120 may receive the access preamble, allocate E-DCH resources to UE 110, and send an AI as well as the E-DCH resource allocation on the AICH to UE 110 (step 2). Node B 120 may perform collision detection and resolution (not shown in FIG. 4).

UE 110 may receive the AI and the E-DCH resource allocation from the AICH and may send data using the allocated E-DCH resources (step 3). UE 110 may remain in the CELL_FACH state and may avoid exchanging RRC signaling with RNC 130 for a state transition. In the design shown in FIG. 4, Node B 120 may send a Resource Release message to UE 110 to de-allocate the allocated E-DCH resources (step 4). UE 110 may release the allocated E-DCH resources and return a Resource Release Complete message (step 5). In another design, UE 110 may initiate the release of the allocated E-DCH resources. In yet another design, the allocated E-DCH resources may be valid for a predetermined amount of time and may be released automatically, without the need to exchange signaling messages to release these resources.

The allocated E-DCH resources may be conveyed to UE 110 in various manners. Several exemplary designs for conveying the allocated E-DCH resources are described below.

Figure 5:
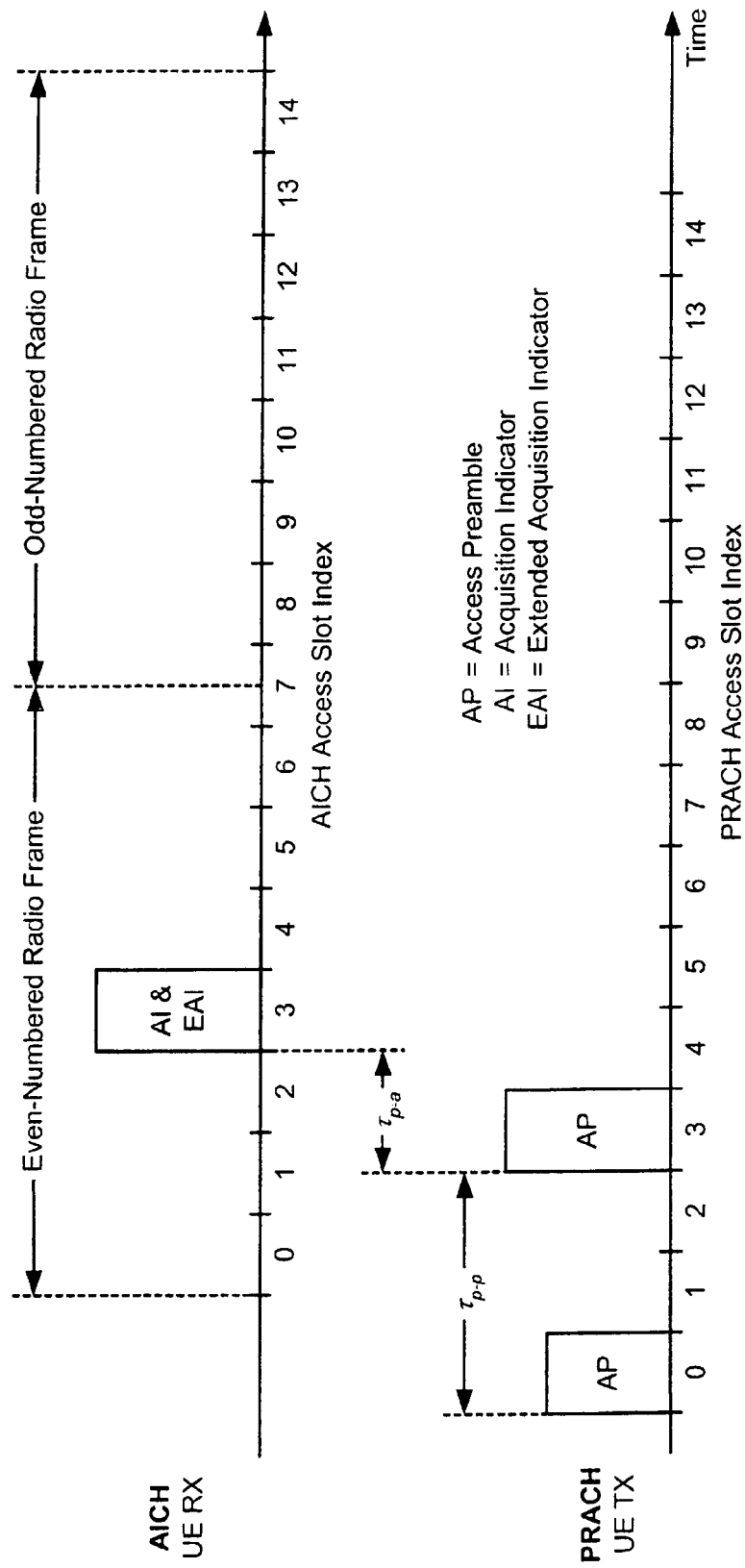
FIG. 5 shows a design of E-DCH resource allocation.

FIG. 5 shows a design of E-DCH resource allocation based on the AICH for the enhanced uplink. In WCDMA, the transmission timeline for each link is partitioned into units of radio frames, with each radio frame covering 10 milli-seconds (ms). For the PRACH, each pair of radio frames is partitioned into 15 PRACH access slots with indices of 0 through 14. For the AICH, each pair of radio frames is partitioned into 15 AICH access slots with indices of 0 through 14. Each PRACH access slot is associated with a corresponding AICH access slot that is $\tau_{p-a}$=7680 chips (or 2 ms) away.

UE 110 may select a signature from a set of signatures available for random access, generate an access preamble based on the selected signature, and send the access preamble on the PRACH in a PRACH access slot available for random access transmission. UE 110 may then listen for a response on the AICH in the corresponding AICH access slot. If a response is not received on the AICH, then UE 110 may resend the access preamble on the PRACH at higher transmit power after a period of at least $\tau_{p-p}$=15,360 chips (or 4 ms). In the example shown in FIG. 5, UE 110 receives a response with allocated E-DCH resources on the AICH in AICH access slot 3. The allocated E-DCH resources may be conveyed in various manners, as described below.

The system may support both "legacy" UEs that do not support the enhanced uplink as well as "new" UEs that support the enhanced uplink. A mechanism may be used to distinguish between the legacy UEs performing the conventional random access procedure and the new UEs using the enhanced uplink. In one design, S available signatures for random access on the PRACH may be divided into two sets—a first set of L signatures available for legacy UEs and a second set of M signatures available for new UEs, where L, M and S may each be any suitable value such that L+M=S. One or both sets of signatures may be broadcast to the UEs or may be known a priori by the UEs. The S available signatures may be assigned indices of 0 through S−1.

In one design, S=16 signatures available for the PRACH may be divided into two sets, with each set including 8 signatures. The legacy UEs may use the 8 signatures in the first set for the conventional random access procedure, and the new UEs may use the 8 signatures in the second set for the enhanced uplink. A Node B can distinguish between signatures from the legacy UEs and signatures from the new UEs. The Node B may perform the conventional random access procedure for each legacy UE and may operate with the enhanced uplink for each new UE. The first and second sets may also include some other number of signatures.

For WCDMA, 16 signatures available for the PRACH are associated with 16 AIs for the AICH, with $AI_s$ being associated with signature s, for s∈{0, . . . , 15} Each AI is a tiernary value and may be set to +1, −1, or 0. The 16 AIs are also associated with 16 AI signature patterns. Each AI signature pattern is a different 32-bit orthogonal sequence. An AICH response for signature s may be generated by (i) multiplying the value of $AI_s$ with the AI signature pattern for signature s to obtain a 32-bit sequence and (ii) spreading the 32-bit sequence with a 256-chip OVSF code for the AICH to generate a 4096-chip sequence for the AICH response.

A total of Y E-DCH resource configurations may be defined, where Y may be any suitable value. Each E-DCH resource configuration may be associated with specific E-DCH resources, e.g., specific resources for the E-DCH, E-AGCH, E-RGCH, F-DPCH, etc. The Y E-DCH resource configurations may be for different E-DCH resources, which may have the same or different transmission capacities. The Y E-DCH resource configurations may be conveyed via a broadcast message or made known to the new UEs in other manners.

A new UE may send an access preamble generated based on a signature for the enhanced uplink on the PRACH. A Node B may receive the access preamble and may allocate an E-DCH resource configuration to the new UE. The Node B may convey the allocated E-DCH resource configuration using various schemes.

In a first scheme, the allocated E-DCH resource configuration may be conveyed via the AICH using one OVSF code and additional signature patterns. In one design, the M signatures available for the PRACH for the enhanced uplink may be associated with M default E-DCH resource configurations, which may be assigned indices of 0 through M−1. If Y<M, then less than M E-DCH resource configurations are available, and multiple signatures may be associated with the same default E-DCH resource configuration. In another design, the M signatures for the enhanced uplink may be associated with default E-DCH resource configurations as follows:

$$X = m \bmod Y, \qquad \text{Eq (1)}$$

where m∈{0, . . . , M−1} denotes the m-th signature for the enhanced uplink, X is a default E-DCH resource configuration index for the m-th signature, and "mod" denotes a modulo operation.

If Y>M, then Y−M non-default E-DCH resource configurations are available and may be assigned indices of M through Y−1. The non-default E-DCH resource configurations (instead of the default E-DCH resource configurations) may be allocated to the new UEs.

In one design, allocation of a default E-DCH resource configuration may be conveyed via the AIs sent on the AICH. A value of +1 for $AI_s$ may indicate that the default E-DCH resource configuration for signature s is allocated to a new UE. A value of −1 for $AI_s$ may indicate that the default E-DCH resource configuration for signature s is not allocated to the new UE.

In one design, allocation of the non-default E-DCH resource configurations may be conveyed via extended acquisition indicators (EAIs) sent on an Enhanced AICH (E-AICH). Each EAI may have a tiernary value of +1, −1, or 0. In one design, 16 EAIs may be defined and may be associated with 16 EAI signatures as well as 16 EAI signature patterns for the E-AICH, with $EAI_{s'}$ being associated with signature s', for s'∈{0, . . . , 15}. The EAI signatures for the E-AICH are denoted by s' (with apostrophe) whereas the signatures for the PRACH are denoted by s (without apostrophe). Each EAI signature pattern may be a different 32-bit orthogonal sequence. The 16 AI signature patterns for the AICH may utilize 16 out of 32 possible 32-bit orthogonal sequences, and the 16 EAI signature patterns for the E-AICH may utilize the remaining 16 32-bit orthogonal sequences. If 16 EAIs are available and each EAI has one of two possible values when sent, then one of 32 possible E-AICH values may be sent on the E-AICH. One E-AICH value (e.g., 0) may be used to convey a negative acknowledgement (NACK) to indicate that no E-DCH resource configuration is allocated. The remaining 31 E-AICH values may be used to convey an allocated E-DCH resource configuration.

In one design, each non-zero E-AICH value may be used as an offset to determine an allocated E-DCH resource configuration, as follow:

$$Z=(X+\text{E-AICH value}) \bmod Y, \quad \text{Eq (2)}$$

where Z is an allocated E-DCH resource configuration index.

In another design, the Y−M non-default E-DCH resource configurations may be assigned indices of 1 through Y−M. Non-zero E-AICH values of 1 through Y−M may be used to directly convey non-default E-DCH resource configurations 1 through Y−M, respectively, as follows:

$$Z=\text{E-AICH value}. \quad \text{Eq (3)}$$

The non-default E-DCH resource configurations and the allocated E-DCH resource configuration may also be conveyed in other manners.

Figure 6:
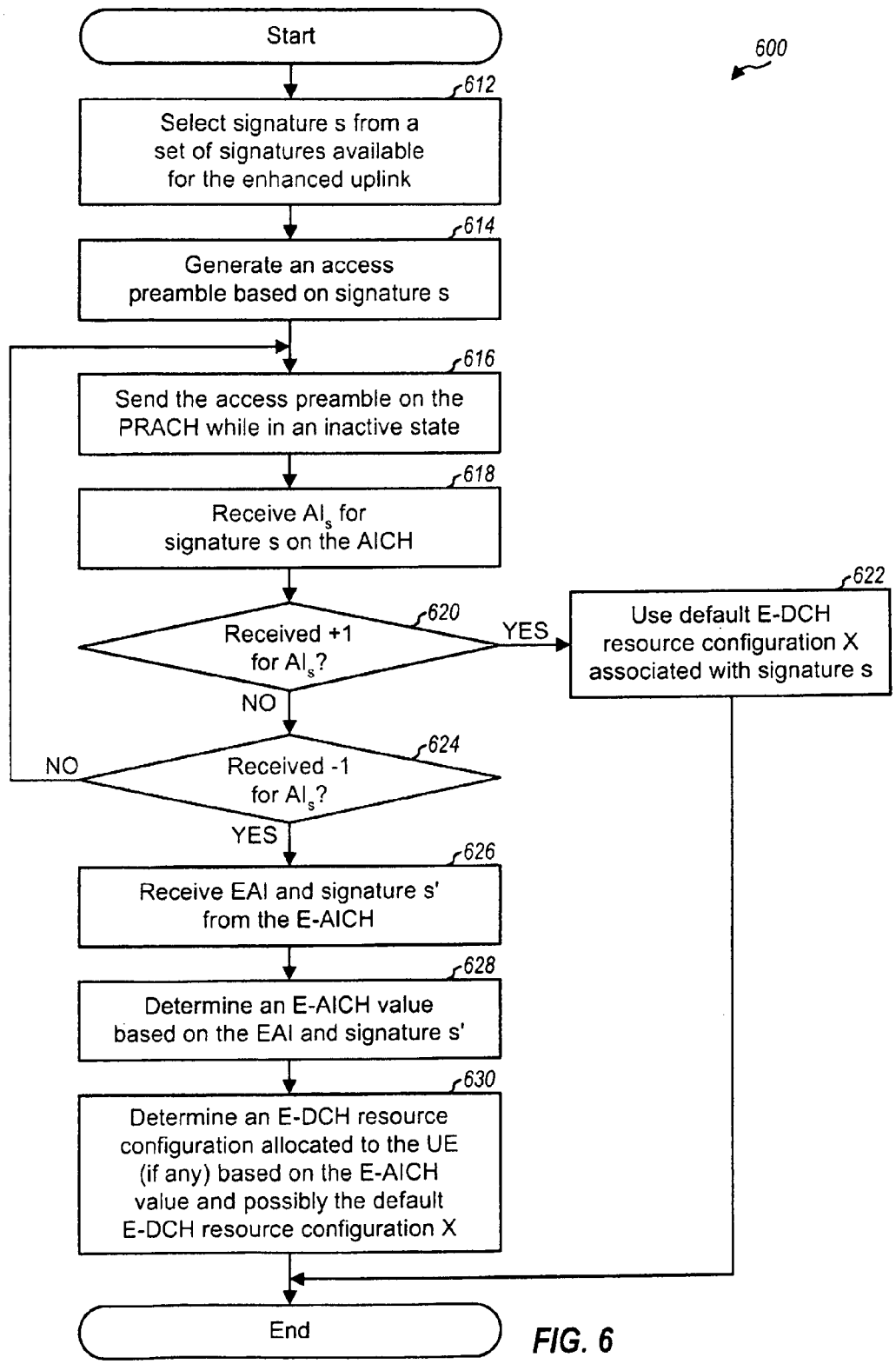
FIG. 6 shows a process performed by a UE for enhanced uplink.

FIG. 6 shows a design of a process 600 performed by a new UE for the enhanced uplink. The UE may select signature s from the set of M signatures available for the PRACH for the enhanced uplink (block 612). The UE may generate an access preamble based on signature s (block 614) and may send the access preamble on the PRACH while in an inactive state (block 616). The UE may then monitor the AICH and the E-AICH for a response.

The UE may receive $AI_s$ for signature s from the AICH (block 618). The UE may determine whether a value of +1 was received for $AI_s$ (block 620). If the answer is 'Yes', then the UE may use default E-DCH resource configuration X associated with signature s (block 622). If a value of +1 was not received for $AI_s$, then the UE may determine whether a value of −1 was received for $AI_s$ (block 624). If the answer is 'Yes', then the UE may receive an EAI and signature s' from the E-AICH (block 626) and may determine an E-AICH value based on the value of the EAI (which may be +1 or −1) and the index of signature s' (which may be within a range of 0 through 15) (block 628). The UE may then determine an E-DCH resource configuration allocated to the UE (if any) based on the E-AICH value and possibly the default E-DCH resource configuration X, e.g., as shown in equation (2) or (3) (block 630). If the E-AICH value indicates a NACK, then the UE may respond in similar manner as a legacy UE's response to a NACK in the conventional random access procedure. If neither +1 nor −1 was received on the AICH ('No' for blocks 620 and 624), then the UE may return to block 616 to resend the access preamble.

In one design of detecting for the E-AICH value, the UE may first despread input samples with the OVSF code for the E-AICH to obtain 16 complex-valued despread symbols. The UE may correlate the despread symbols with each of 16 possible complex-valued EAI signature patterns. Each complex-valued EAI signature pattern may be obtained by mapping each pair of bits in one 32-bit EAI signature pattern to a complex-valued symbol. The UE may obtain 16 correlation results for the 16 complex-valued EAI signature patterns and may select the EAI signature pattern with the largest correlation result as the one transmitted by the Node B. The UE may then determine between two possible values of +1 or −1 based on the sign of the largest correlation result. The UE may determine the transmitted E-AICH value based on the detected EAI signature pattern and the detected polarity of +1 or −1.

Figure 7:
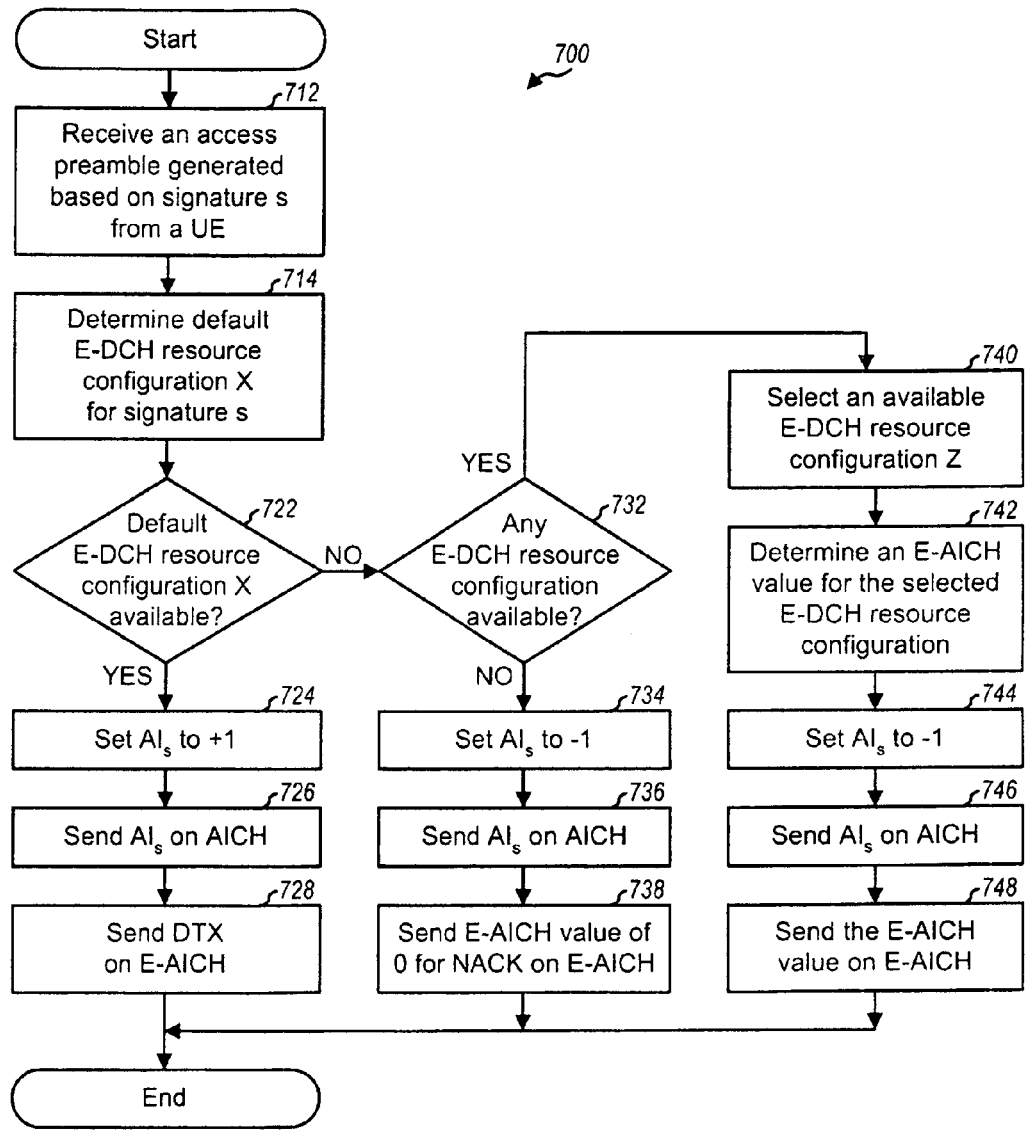
FIG. 7 shows a process performed by a Node B for enhanced uplink.

FIG. 7 shows a design of a process 700 performed by a Node B for the enhanced uplink. The Node B may receive an access preamble generated based on signature s from a new UE (block 712). The Node B may determine the default E-DCH resource configuration X for signature s, e.g., based on a predetermined mapping (block 714).

The Node B may then determine whether default E-DCH resource configuration X is available (block 722). If default E-DCH resource configuration X is available, then the Node B may set $AI_s$ for signature s to +1 (block 724). The Node B may then send $AI_s$ on the AICH (block 726) and send nothing or discontinuous transmission (DTX) on the E-AICH (block 728). Conversely, if default E-DCH resource configuration X is not available ('No' for block 722), then the Node B may determine whether any E-DCH resource configuration is available (block 732). If the answer is 'No', then the Node B may set $AI_s$ to −1 (block 734), send $AI_s$ on the AICH (block 736), and send an E-AICH value of 0 on the E-AICH to convey a NACK for the new UE (block 738).

If at least one E-DCH resource configuration is available ('Yes' for block 732), then the Node B may select an available E-DCH resource configuration Z, which may be a default or non-default E-DCH resource configuration (block 740). The Node B may then determine an E-AICH value for the selected E-DCH resource configuration (block 742). For the design shown in equation (2), the Node B may determine the offset between the selected E-DCH resource configuration Z and the default E-DCH resource configuration X. The Node B may then determine an E-AICH value corresponding to this offset. For the design shown in equation (3), the Node B may determine the E-AICH value for the selected E-DCH resource configuration Z based on the direct mapping. For both designs, the Node B may set $AI_s$ to −1 (block 744), send $AI_s$ on the AICH (block 746), and send the E-AICH value on the E-AICH to convey allocation of E-DCH resource configuration Z to the new UE (block 748).

For the design shown in FIG. 7, $AI_s$ for signature s may be set as follows:

$AI_s=+1$: UE is allocated default E-DCH resource configuration for signature s, or $AI_s=-1$: UE should monitor the E-AICH for E-DCH resource allocation.

For the design shown in FIG. 7, the EAI value may be set as follows:

EAI value=DTX: nothing is sent on E-AICH since default E-DCH resource configuration is allocated to the UE, EAI value=0: E-DCH resource configuration is not allocated, or EAI value=m: offset or index for allocated E-DCH resource configuration.

A Node B may receive one or more access preambles from one or more UEs in a given PRACH access slot and may be able to respond to one or more UEs on the AICH. The AI signature patterns and the EAI signature patterns are orthogonal to one another. The Node B may thus be able to send AICH responses to one or more UEs in the same AICH access slot.

Table 3 gives an example partition of 16 signatures available for the PRACH to legacy and new UEs. In this example, the first eight signatures s=0 through 7 are reserved for legacy UEs, and the last eight signatures s=8 through 15 are reserved for new UEs. Signatures 8 through 15 are associated with default E-DCH resource configurations R0 through R7, respectively, which are assigned E-DCH resource configuration indices of X=0 through 7, respectively.

TABLE 3

Signature Allocation for Legacy and New UEs

| Preamble Signature s | For | Preamble Signature s | For | E-DCH Resource Configuration Index X | Default E-DCH Resource Configuration |
|---|---|---|---|---|---|
| Signature 0 | legacy UEs | Signature 8 | new UEs | 0 | R0 |
| Signature 1 | legacy UEs | Signature 9 | new UEs | 1 | R1 |
| Signature 2 | legacy UEs | Signature 10 | new UEs | 2 | R2 |
| Signature 3 | legacy UEs | Signature 11 | new UEs | 3 | R3 |
| Signature 4 | legacy UEs | Signature 12 | new UEs | 4 | R4 |
| Signature 5 | legacy UEs | Signature 13 | new UEs | 5 | R5 |
| Signature 6 | legacy UEs | Signature 14 | new UEs | 6 | R6 |
| Signature 7 | legacy UEs | Signature 15 | new UEs | 7 | R7 |

Table 4 shows a design of mapping E-AICH values to $EAI_s$ and signature s' for the E-AICH. In this design, E-AICH value 0 is used for NACK and is obtained by sending $EAI_0$ of +1 with signature s'=0 on the E-AICH. Each remaining E-AICH value may be obtained by sending $EAI_{s'}$ of either +1 or −1 with one of 16 signatures s' on the E-AICH, as shown in Table 4. E-AICH value m represents an offset of m. The E-DCH resource configuration index Z corresponding to E-AICH value m may be determined as Z=(X+m) mod Y.

TABLE 4

E-AICH Value to E-DCH Resource Configuration Mapping

| E-AICH Value | $EAI_{s'}$ | EAI Signature s' | E-DCH Resource Configuration Index Z |
|---|---|---|---|
| 0 | +1 | 0 | NACK |
| 1 | −1 | 0 | (X + 1) mod Y |
| 2 | +1 | 1 | (X + 2) mod Y |
| 3 | −1 | 1 | (X + 3) mod Y |
| 4 | +1 | 2 | (X + 4) mod Y |
| 5 | −1 | 2 | (X + 5) mod Y |
| 6 | +1 | 3 | (X + 6) mod Y |
| 7 | −1 | 3 | (X + 7) mod Y |
| 8 | +1 | 4 | (X + 8) mod Y |
| 9 | −1 | 4 | (X + 9) mod Y |
| 10 | +1 | 5 | (X + 10) mod Y |
| 11 | −1 | 5 | (X + 11) mod Y |
| 12 | +1 | 6 | (X + 12) mod Y |
| 13 | −1 | 6 | (X + 13) mod Y |
| 14 | +1 | 7 | (X + 14) mod Y |
| 15 | −1 | 7 | (X + 15) mod Y |
| 16 | +1 | 8 | (X + 16) mod Y |
| 17 | −1 | 8 | (X + 17) mod Y |
| 18 | +1 | 9 | (X + 18) mod Y |
| 19 | −1 | 9 | (X + 19) mod Y |
| 20 | +1 | 10 | (X + 20) mod Y |
| 21 | −1 | 10 | (X + 21) mod Y |
| 22 | +1 | 11 | (X + 22) mod Y |
| 23 | −1 | 11 | (X + 23) mod Y |
| 24 | +1 | 12 | (X + 24) mod Y |
| 25 | −1 | 12 | (X + 25) mod Y |
| 26 | +1 | 13 | (X + 26) mod Y |
| 27 | −1 | 13 | (X + 27) mod Y |
| 28 | +1 | 14 | (X + 28) mod Y |
| 29 | −1 | 14 | (X + 29) mod Y |
| 30 | +1 | 15 | (X + 30) mod Y |
| 31 | −1 | 15 | (X + 31) mod Y |

Table 4 shows one design of mapping E-AICH values to $EAI_s$ and signature s' for the E-AICH. In another design, E-AICH values of 0 through 15 may be obtained by sending +1 for $EAI_0$ through $EAI_{15}$ with EAI signatures 0 through 15, respectively. E-AICH values of 16 through 31 may be obtained by sending −1 for $EAI_0$ through $EAI_{15}$ with EAI signatures 0 through 15, respectively. The E-AICH values may also be mapped to $EAI_s$ and signature s' in other manners.

As an example for the design shown in Tables 3 and 4, a new UE may select signature s=13, generate an access preamble with signature 13, and send the access preamble on the PRACH. Table 3 indicates that signature 13 is associated with default E-DCH resource configuration R5 with an index of X=5. A Node B may receive the access preamble, determine that signature 13 was received, and check to see if R5 is available. If R5 is available, then the Node B may send +1 for $AI_{13}$ on the AICH and may send DTX on the E-AICH. If R5 is not available, then the Node B may determine that R17 with index Z=17 is available. The Node B may determine the offset as Z−X=17−5=12. The Node B may then send −1 for $AI_{13}$ on the AICH and may send +1 for $EAI_{6'}$ on the E-AICH to convey an E-AICH value of 12.

In a second scheme, an allocated E-DCH resource configuration may be conveyed via a separate OVSF code for the AICH. A first 256-chip OVSF code may be used to send AIs on the AICH for access preambles received on the PRACH. A second 256-chip OVSF code may be used to convey the allocated E-DCH resource configuration for a new UE. Up to 16 bits A1 through A16 may be sent using the second OVSF code and may be referred to as E-DCH resource allocation (RA) bits. The AIs and the allocated E-DCH resource configuration may be sent using the two OVSF codes in various manners.

In one design, the 16 available signatures for the PRACH may be associated with 16 AIs for the AICH, with $AI_s$ being associated with signature s, for s∈{0, . . . , 15}. Each AI may be a tiernary value and may be set to +1, −1, or 0. $AI_s$ for signature s for the enhanced uplink may be set as follow:

$AI_s$=0: signature s was not received by a Node B,
$AI_s$=+1: signature s was received by the Node B, and the E-DCH resource allocation will be sent using bits A1 through A8 on the second OVSF code, or
$AI_s$=−1: signature s was received by the Node B, and the E-DCH resource allocation will be sent using bits A9 through A16 on the second OVSF code.

RA bits A1 through A8 may be used to convey E-DCH resource allocation for a new UE for which an AI of +1 was sent on the first OVSF code. RA bits A9 through A16 may be used to convey E-DCH resource allocation for a new UE for which an AI of −1 was sent. Each set of 8 RA bits may convey one of 256 possible E-AICH values. One E-AICH value (e.g., 0) may be used to convey a NACK to indicate that no E-DCH resources are allocated. Another E-AICH value (e.g., 1) may be used to indicate that the UE should use the RACH for PRACH message transmission. In this case, the UE may observe the defined timing relationship between a PRACH preamble and a PRACH message transmission. Y E-AICH values may be used for Y E-DCH resource configurations. The number of RA bits to use may then be dependent on the number of E-DCH resource configurations plus two additional E-AICH values.

Table 5 shows a design of mapping E-AICH values to E-DCH resource configurations for a case in which Y=8 E-DCH resource configurations may be conveyed using four RA bits. In this design, E-AICH value 0 is used for NACK and is obtained by sending −1, −1, −1 and −1 for RA bits A1 through A4 (or RA bits A9 through A12). E-AICH value 1 is used to indicate that the RACH should be used and is obtained by sending −1, −1, −1 and +1 for RA bits A1 through A4 (or RA bits A9 through A12). Each remaining E-AICH value may be obtained by sending RA bit values shown in Table 5.

TABLE 5

E-AICH Value to E-DCH Resource Configuration Mapping

| E-AICH Value | $AI_s = +1$ RA Bits | | | | $AI_s = -1$ RA Bits | | | | E-DCH Resource Configuration |
|---|---|---|---|---|---|---|---|---|---|
| | A4 | A3 | A2 | A1 | A12 | A11 | A10 | A9 | |
| 0 | −1 | −1 | −1 | −1 | −1 | −1 | −1 | −1 | NACK |
| 1 | −1 | −1 | −1 | +1 | −1 | −1 | −1 | +1 | RACH |
| 2 | −1 | −1 | +1 | −1 | −1 | −1 | +1 | −1 | R0 |
| 3 | −1 | −1 | +1 | +1 | −1 | −1 | +1 | +1 | R1 |
| 4 | −1 | +1 | −1 | −1 | −1 | +1 | −1 | −1 | R2 |
| 5 | −1 | +1 | −1 | +1 | −1 | +1 | −1 | +1 | R3 |
| 6 | −1 | +1 | +1 | −1 | −1 | +1 | +1 | −1 | R4 |
| 7 | −1 | +1 | +1 | +1 | −1 | +1 | +1 | +1 | R5 |
| 8 | +1 | −1 | −1 | −1 | +1 | −1 | −1 | −1 | R6 |
| 9 | +1 | −1 | −1 | +1 | +1 | −1 | −1 | +1 | R7 |

Table 5 shows one design of mapping E-AICH values to E-DCH resource configurations. This design allows E-DCH resources to be allocated and conveyed to up to two UEs in the same AICH access slot using two AI values and two sets of RA bits. The E-AICH values may also be mapped to E-DCH resource configurations in other manners.

For both schemes described above, the transmit power for the AIs may be set to obtain the desired detection performance by the UEs. The transmit power for the EAIs or RA bits may also be set to obtain the desired detection performance. For the first scheme, a Node B may receive an access preamble from a new UE and may send one AI on the AICH and possibly one EAI on the E-AICH to the UE. The same transmit power level may be used for both the AICH and E-AICH. For the second scheme, a Node B may receive an access preamble from a new UE and may send one AI with the first OVSF code and multiple RA bits with the second OVSF code to the UE. More transmit power may be used for the RA bits than the AI.

The techniques described herein may provide certain advantages. First, the number of E-DCH resource configurations that may be allocated to each preamble signature may be scalable (or easily increased) without any change to the design. Second, the E-DCH resource allocation may be conveyed using the existing AICH, which may allow for reuse of existing Node B and UE equipment. Furthermore, the techniques reuse the existing method of sending ACK/NACK to a UE in response to reception of an access preamble. Third, ACK/NACK and E-DCH resource allocation may be sent in a link efficient manner. Fourth, the E-DCH resources may be quickly allocated and conveyed along with the AIs in the AICH response. Fifth, the preamble signatures for the enhanced uplink may be decoupled from the E-DCH resource configurations, which may support a scalable design. Sixth, the UE may be instructed to use the RACH (e.g., when the Node B runs out of E-DCH resources) by sending a specially defined E-AICH value, e.g., as shown in Table 5. Other advantages may also be obtained with the techniques described herein.

Figures 8, 9:
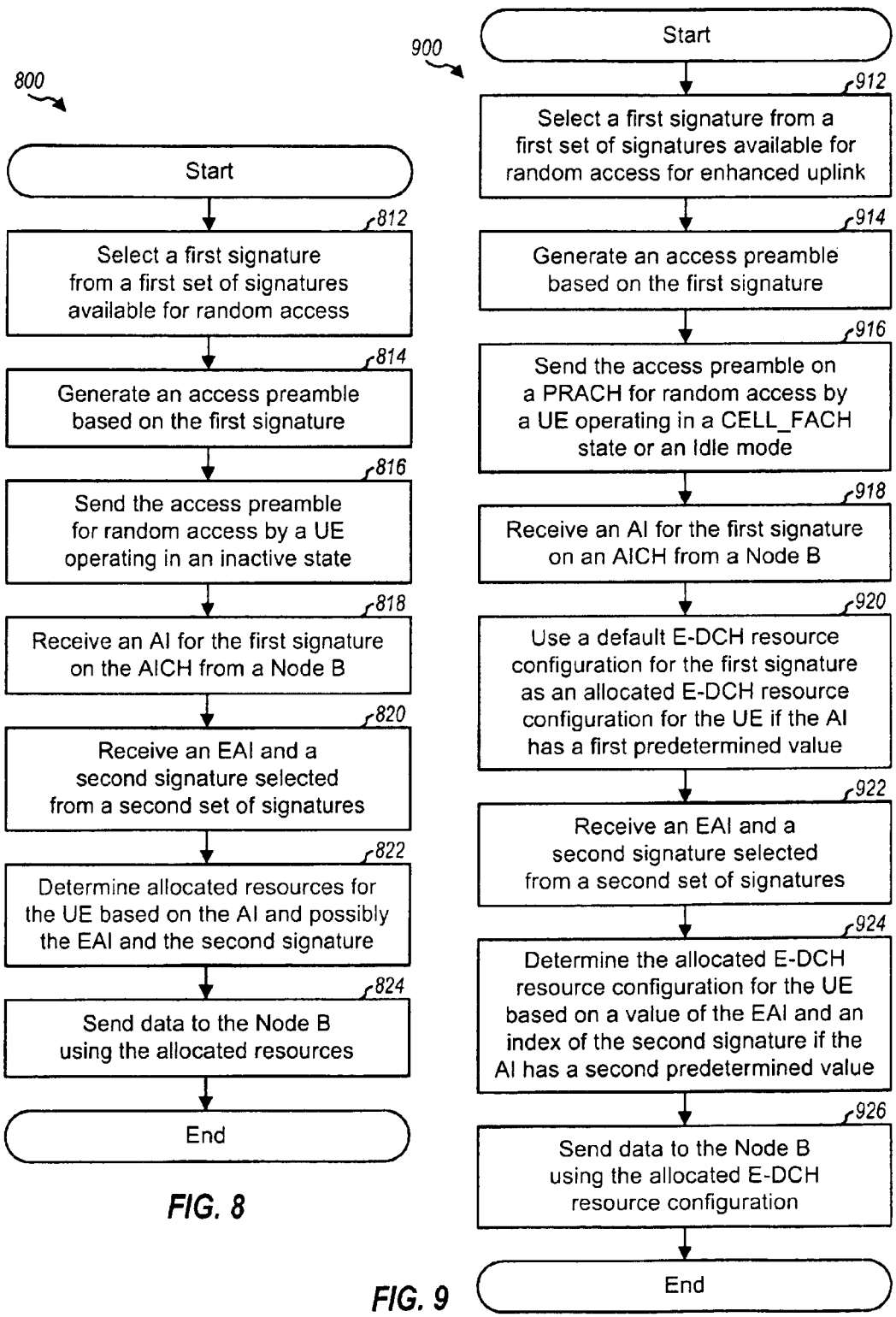
FIGS. 8 and 9 show two processes for performing random access by a UE.

FIG. 8 shows a design of a process 800 for performing random access by a UE. The UE may select a first signature (e.g., preamble signature s) from a first set of signatures available for random access (block 812). The UE may generate an access preamble based on the first signature (block 814). The UE may send the access preamble for random access while operating in an inactive state, e.g., a CELL_FACH state or an Idle mode (block 816). The UE may thereafter receive an AI (e.g., $AI_s$) for the first signature on the AICH from a Node B (block 818). The UE may also receive an EAI (e.g., $EAI_{s'}$) and a second signature (e.g., EAI signature s') selected from a second set of signatures (block 820). The UE may determine allocated resources for the UE based on the AI and possibly the EAI and the second signature (block 822). The UE may send data to the Node B using the allocated resources, e.g., while remaining in the inactive state (block 824).

In one design, the UE may use default resources for the first signature as the allocated resources if the AI has a first predetermined value, e.g., +1. The UE may determine the allocated resources for the UE based on the EAI and the second signature if the AI has a second predetermined value, e.g., −1.

FIG. 9 shows a design of another process 900 for performing random access by a UE. The UE may select a first signature from a first set of signatures available for random access for enhanced uplink (block 912). The UE may generate an access preamble based on the first signature (block 914). The UE may send the access preamble on a PRACH for random access, e.g., while operating in a CELL_FACH state or an Idle mode (block 916). The UE may receive an AI for the first signature on an AICH from a Node B (block 918). The UE may use a default E-DCH resource configuration for the first signature as an allocated E-DCH resource configuration if the AI has a first predetermined value (block 920). The UE may also receive an EAI and a second signature selected from a second set of signatures from the Node B (block 922). The UE may determine the allocated E-DCH resource configuration for the UE based on a value of the EAI and an index of the second signature if the AI has a second predetermined value (block 924). In any case, the UE may send data to the Node B using the allocated E-DCH resource configuration, e.g., while remaining in the CELL_FACH state or the Idle mode (block 926).

In one design of block 924, the UE may (i) determine an offset based on the value of the EAI and the index of the second signature and (ii) determine an index of the allocated E-DCH resource configuration based on the offset and an index of the default E-DCH resource configuration for the first signature. In another design, the UE may determine an index of the allocated E-DCH resource configuration based on the value of the EAI and the index of the second signature. The UE may also determine that a NACK was sent for the access preamble if the EAI has a designated value (e.g., +1) and the second signature is a designated signature (e.g., signature 0).

In one design, the UE may detect for the AI based on a first set of signature patterns and may detect for the EAI based on a second set of signature patterns. The signature patterns in the first and second sets may be orthogonal to one another. The AI and EAI may be sent with a single channelization code.

Figure 10:
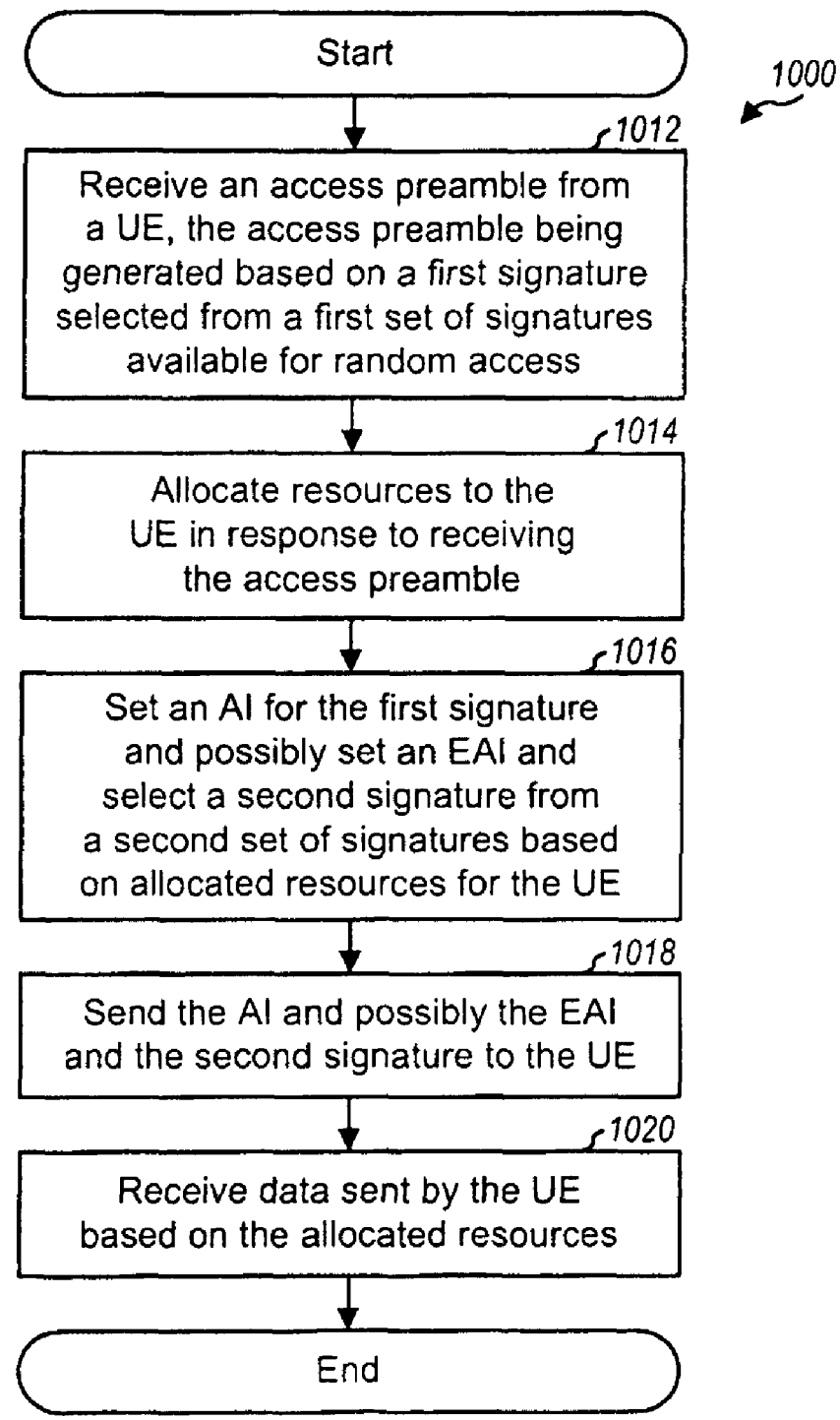
FIGS. 10 and 11 show two processes for supporting random access by a Node B.

FIG. 10 shows a design of a process 1000 for supporting random access by a Node B. The Node B may receive an access preamble from a UE, with the access preamble being generated based on a first signature selected from a first set of signatures available for random access (block 1012). The Node B may allocate resources to the UE in response to receiving the access preamble (block 1014). The Node B may set an AI for the first signature and may also set an EAI and select a second signature from a second set of signatures based on allocated resources for the UE (block 1016). The AI may indicate reception of the access preamble and may further be used to convey the allocated resources for the UE. The Node B may send the AI and possibly the EAI and the second signature to the UE (block 1018). The Node B may thereafter receive data sent by the UE based on the allocated resources (block 1020).

In one design, the Node B may allocate default resources for the first signature to the UE if the default resources are available. The Node B may then set the AI to a first predetermined value to indicate the default resources being allocated to the UE. In one design, the Node B may allocate resources selected from a group of available resources if the default resources are not available. The Node B may then set the EAI and select the second signature based on the selected resources and possibly the default resources.

Figure 11:
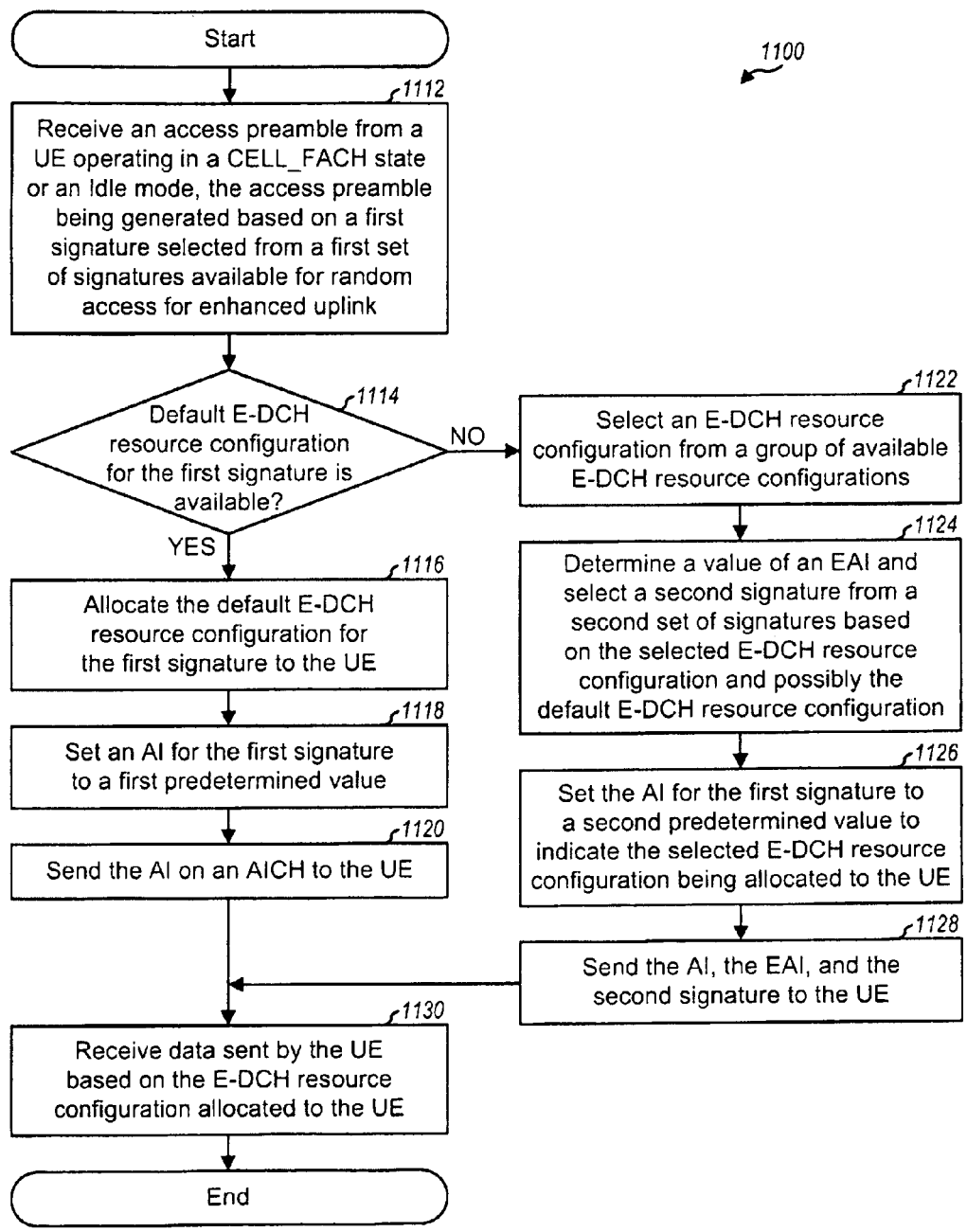

FIG. 11 shows a design of another process 1100 for supporting random access by a Node B. The Node B may receive an access preamble sent on a PRACH by a UE operating in a CELL_FACH state or an Idle mode, with the access preamble being generated based on a first signature selected from a first set of signatures available for random access for enhanced uplink (block 1112). The Node B may determine if a default E-DCH resource configuration for the first signature is available (block 1114). If the answer is 'Yes', then the Node B may allocate the default E-DCH resource configuration for the first signature to the UE (block 1116). The Node B may then set an AI for the first signature to a first predetermined value, e.g., +1 (block 1118) and may send the AI on an AICH to the UE (block 1120).

Otherwise, if the default E-DCH resource configuration is not available ('No' for block 1116), then the Node B may select an E-DCH resource configuration from a group of available E-DCH resource configurations (block 1122). The Node B may then determine a value of an EAI and may select a second signature from a second set of signatures based on the selected E-DCH resource configuration and possibly the default E-DCH resource configuration (block 1124). The Node B may set the AI for the first signature to a second predetermined value (e.g., −1) to indicate the selected E-DCH resource configuration being allocated to the UE (block 1126). The Node B may then send the AI, the EAI, and the second signature to the UE (block 1128). The Node B may thereafter receive data sent by the UE based on the E-DCH resource configuration allocated to the UE (block 1130).

In one design of block 1124, the Node B may determine an offset between an index for the selected E-DCH resource configuration and an index for the default E-DCH resource configuration. The Node B may then determine the value of the EAI and select the second signature based on the offset. In another design, the Node B may determine the value of the EAI and select the second signature based on the index of the selected E-DCH resource configuration with direct mapping. In one design, the Node B may set the AI for the first signature to the second predetermined value, set the EAI to a designated value (e.g., +1), and select a designated signature (e.g., signature 0) from the second set of signatures to indicate a NACK being sent for the access preamble.

In one design, the Node B may multiply the AI with a first signature pattern from a first set of signature patterns to obtain a first sequence, multiply the EAI with a second signature pattern from a second set of signature patterns to obtain a second sequence, and spread the first and second sequences with a single channelization code for the AICH. The first signature pattern may be associated with the first signature, and the second signature pattern may be associated with the second signature. The signature patterns in the first and second sets may be orthogonal to one another.

Figure 12:
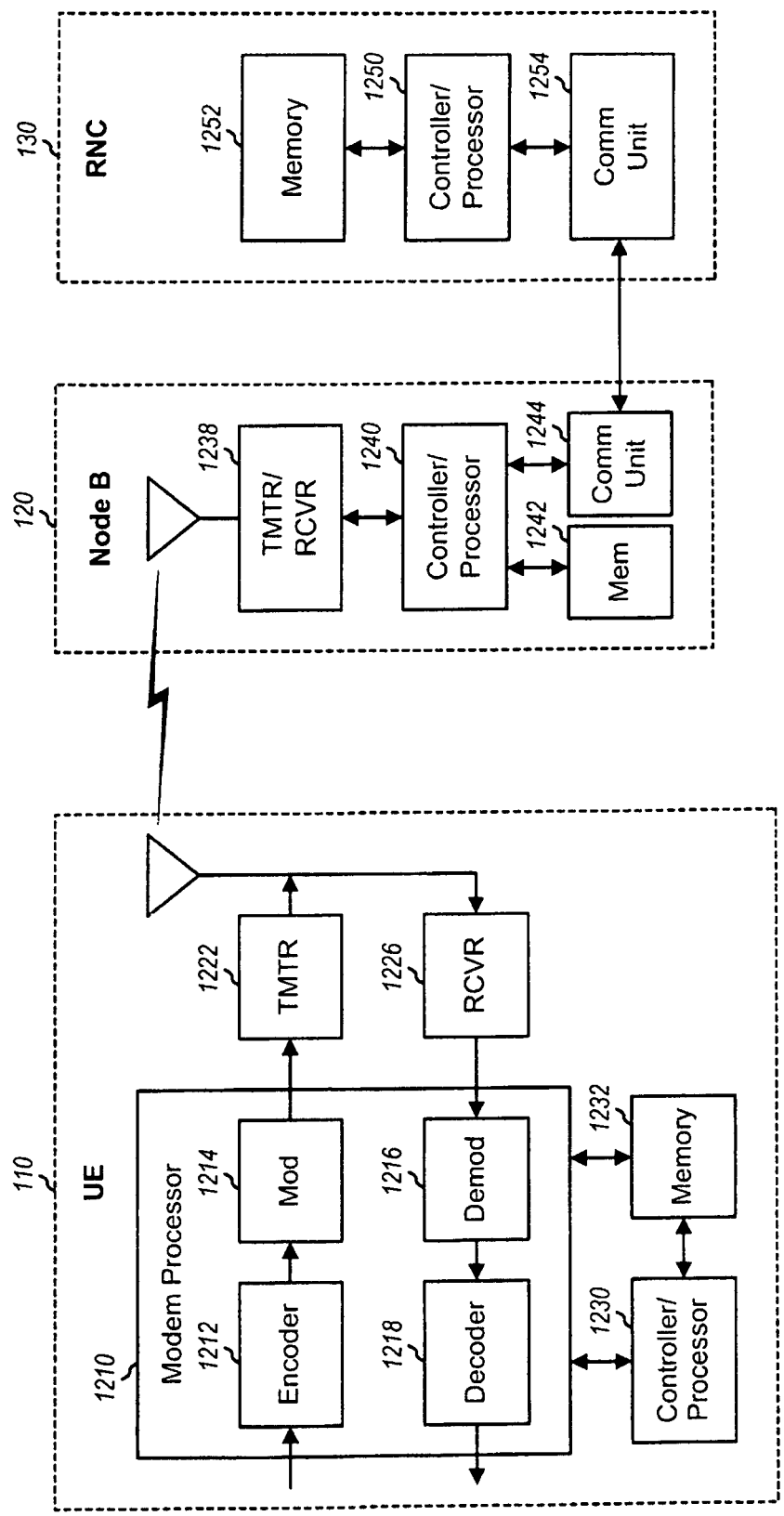
FIG. 12 shows a block diagram of a UE and a Node B.

FIG. 12 shows a block diagram of a design of UE 110, Node B 120, and RNC 130 in FIG. 1. At UE 110, an encoder 1212 may receive information (e.g., access preamble, messages, data, etc.) to be sent by UE 110. Encoder 1212 may process (e.g., encode and interleave) the information to obtain coded data. A modulator (Mod) 1214 may further process (e.g., modulate, channelize, and scramble) the coded data and provide output samples. A transmitter (TMTR) 1222 may condition (e.g., convert to analog, filter, amplify, and frequency upconvert) the output samples and generate an uplink signal, which may be transmitted to one or more Node Bs. UE 110 may also receive downlink signals transmitted by one or more Node Bs. A receiver (RCVR) 1226 may condition (e.g., filter, amplify, frequency downconvert, and digitize) a received signal and provide input samples. A demodulator (Demod) 1216 may process (e.g., descramble, channelize, and demodulate) the input samples and provide symbol estimates. A decoder 1218 may process (e.g., deinterleave and decode) the symbol estimates and provide information (e.g., $AI_s$, $EAI_s$, signatures, messages, data, etc.) sent to UE 110. Encoder 1212, modulator 1214, demodulator 1216, and decoder 1218 may be implemented by a modem processor 1210. These units may perform processing in accordance with the radio technology (e.g., WCDMA) used by the system. A controller/processor 1230 may direct the operation of various units at UE 110.

Controller/processor 1230 may perform or direct process 600 in FIG. 6, process 800 in FIG. 8, process 900 in FIG. 9, and/or other processes for the techniques described herein. Controller/processor 1230 may also perform or direct the tasks performed by UE 110 in FIGS. 3 and 4. Memory 1232 may store program codes and data for UE 110.

At Node B 120, a transmitter/receiver 1238 may support radio communication with UE 110 and other UEs. A controller/processor 1240 may perform various functions for communication with the UEs. For the uplink, the uplink signal from UE 110 may be received and conditioned by receiver 1238 and further processed by controller/processor 1240 to recover the information sent by UE 110. For the downlink, information may be processed by controller/processor 1240 and conditioned by transmitter 1238 to generate a downlink signal, which may be transmitted to UE 110 and other UEs. Controller/processor 1240 may perform or direct process 700 in FIG. 7, process 1000 in FIG. 10, process 1100 in FIG. 11, and/or other processes for the techniques described herein. Controller/processor 1240 may also perform or direct the tasks performed by Node B 120 in FIGS. 3 and 4. Memory 1242 may store program codes and data for Node B 120. A communication (Comm) unit 1244 may support communication with RNC 130 and other network entities.

At RNC 130, a controller/processor 1250 may perform various functions to support communication services for the UEs. Controller/processor 1250 may also perform or direct the tasks performed by RNC 130 in FIGS. 3 and 4. Memory 1252 may store program codes and data for RNC 130. A communication unit 1254 may support communication with Node B 120 and other network entities.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the scope of the disclosure. Thus, the disclosure is not intended to be limited to the examples and designs described herein but is to be accorded the widest scope consistent with the principles and novel features disclosed herein.

What is claimed is:

1. A method for wireless communication, comprising:
    selecting a first signature from a first set of signatures available for random access;
    generating an access preamble based on the first signature;
    sending the access preamble for random access by a user equipment (UE) operating in an inactive state;
    receiving an acquisition indicator (AI) for the first signature on an acquisition indicator channel (AICH) from a Node B;
    determining allocated resources for the UE based on the first signature and the AI if the AI has a first predetermined value;
    receiving an extended acquisition indicator (EAI) and a second signature selected from a second set of signatures;
    determining allocated resources for the UE based on the second signature and the EAI if the AI has a second predetermined value; and
    sending data to the Node B using the allocated resources.

2. The method of claim 1, further comprising:
    remaining in the inactive state while sending data to the Node B using the allocated resources.

3. The method of claim 1, wherein the inactive state comprises a CELL_FACH state or an Idle mode.

4. The method of claim 1, wherein the determining allocated resources for the UE based on the first signature comprises
    determining default resources for the first signature, and
    using the default resources as the allocated resources if the AI has the first predetermined value.

5. The method of claim 1, wherein the AI and the EAI are sent using a single channelization code.

6. The method of claim 1, wherein the AI is sent using a first channelization code and the EAI is sent using a second channelization code.

7. A method for wireless communication, comprising:
    selecting a first signature from a first set of signatures available for random access for enhanced uplink;

generating an access preamble based on the first signature;
sending the access preamble for random access by a user equipment (UE) operating in a CELL_FACH state or an Idle mode;
receiving an acquisition indicator (AI) for the first signature on an acquisition indicator channel (AICH) from a Node B;
using a default enhanced dedicated channel (E-DCH) resource configuration for the first signature as an allocated E-DCH resource configuration for the UE if the AI has a first predetermined value; and
sending data to the Node B using the allocated E-DCH resource configuration.

8. The method of claim 7, further comprising:
receiving an extended acquisition indicator (EAI) and a second signature selected from a second set of signatures; and
determining the allocated E-DCH resource configuration for the UE based on a value of the EAI and an index of the second signature if the AI has a second predetermined value.

9. The method of claim 8, wherein the determining the allocated E-DCH resource configuration comprises
determining an offset based on the value of the EAI and the index of the second signature, and
determining an index of the allocated E-DCH resource configuration based on the offset and an index of the default E-DCH resource configuration for the first signature.

10. The method of claim 8, wherein the determining the allocated E-DCH resource configuration comprises
determining an index of the allocated E-DCH resource configuration based on the value of the EAI and the index of the second signature.

11. The method of claim 8, further comprising:
detecting for the AI based on a first set of signature patterns; and
detecting for the EAI based on a second set of signature patterns, the signature patterns in the first and second sets being orthogonal to one another.

12. The method of claim 7, further comprising:
receiving an extended acquisition indicator (EAI) and a second signature selected from a second set of signatures; and
determining that a negative acknowledgement (NACK) is sent for the access preamble if the AI has a second predetermined value, the EAI has a designated value, and the second signature is a designated signature.

13. An apparatus for wireless communication, comprising:
means for selecting a first signature from a first set of signatures available for random access for enhanced uplink;
means for generating an access preamble based on the first signature;
means for sending the access preamble for random access by a user equipment (UE) operating in a CELL_FACH state or an Idle mode;
means for receiving an acquisition indicator (AI) for the first signature on an acquisition indicator channel (AICH) from a Node B;
means for using a default enhanced dedicated channel (E-DCH) resource configuration for the first signature as an allocated E-DCH resource configuration for the UE if the AI has a first predetermined value; and
means for sending data to the Node B using the allocated E-DCH resource configuration.

14. The apparatus of claim 13, further comprising:
means for receiving an extended acquisition indicator (EAI) and a second signature selected from a second set of signatures; and
means for determining the allocated E-DCH resource configuration for the UE based on a value of the EAI and an index of the second signature if the AI has a second predetermined value.

15. The apparatus of claim 14, wherein the means for determining the allocated E-DCH resource configuration comprises
means for determining an offset based on the value of the EAI and the index of the second signature, and
means for determining an index of the allocated E-DCH resource configuration based on the offset and an index of the default E-DCH resource configuration for the first signature.

16. The apparatus of claim 13, further comprising:
means for receiving an extended acquisition indicator (EAI) and a second signature selected from a second set of signatures; and
means for determining that a negative acknowledgement (NACK) is sent for the access preamble if the AI has a second predetermined value, the EAI has a designated value, and the second signature is a designated signature.

17. A non-transitory computer-readable medium comprising:
code for causing at least one computer to select a first signature from a first set of signatures available for random access for enhanced uplink,
code for causing the at least one computer to generate an access preamble based on the first signature,
code for causing the at least one computer to send the access preamble for random access by a user equipment (UE) operating in a CELL_FACH state or an Idle mode,
code for causing the at least one computer to receive an acquisition indicator (AI) for the first signature on an acquisition indicator channel (AICH) from a Node B,
code for causing the at least one computer to use a default enhanced dedicated channel (E-DCH) resource configuration for the first signature as an allocated E-DCH resource configuration for the UE if the AI has a first predetermined value, and
code for causing the at least one computer to send data to the Node B using the allocated E-DCH resource configuration.

18. An apparatus for wireless communication, comprising:
at least one processor configured to select a first signature from a first set of signatures available for random access for enhanced uplink, to generate an access preamble based on the first signature, to send the access preamble for random access by a user equipment (UE) operating in a CELL_FACH state or an Idle mode, to receive an acquisition indicator (AI) for the first signature on an acquisition indicator channel (AICH) from a Node B, to use a default enhanced dedicated channel (E-DCH) resource configuration for the first signature as an allocated E-DCH resource configuration for the UE if the AI has a first predetermined value, and to send data to the Node B using the allocated E-DCH resource configuration.

19. The apparatus of claim 18, wherein the at least one processor is configured to receive an extended acquisition indicator (EAI) and a second signature selected from a second set of signatures, and to determine the allocated E-DCH resource configuration for the UE based on a value of the EAI and an index of the second signature if the AI has a second predetermined value.

20. The apparatus of claim 19, wherein the at least one processor is configured to determine an offset based on the value of the EAI and the index of the second signature, and to determine an index of the allocated E-DCH resource configuration based on the offset and an index of the default E-DCH resource configuration for the first signature.

21. The apparatus of claim 18, wherein the at least one processor is configured to receive an extended acquisition indicator (EAI) and a second signature selected from a second set of signatures, and to determine that a negative acknowledgement (NACK) is sent for the access preamble if the AI has a second predetermined value, the EAI has a designated value, and the second signature is a designated signature.

* * * * *